United States Patent
Ghosh et al.

(10) Patent No.: US 10,404,067 B2
(45) Date of Patent: Sep. 3, 2019

(54) CONGESTION CONTROL IN ELECTRIC POWER SYSTEM UNDER LOAD AND UNCERTAINTY

(71) Applicant: Utopus Insights, Inc., Valhalla, NY (US)

(72) Inventors: Soumyadip Ghosh, Peekskill, NY (US); Dung Phan, Ossining, NY (US)

(73) Assignee: Utopus Insights, Inc., Valhalla, NY (US)

( * ) Notice: Subject to any disclaimer, the term of this patent is extended or adjusted under 35 U.S.C. 154(b) by 359 days.

(21) Appl. No.: 15/149,962

(22) Filed: May 9, 2016

(65) Prior Publication Data
US 2017/0324243 A1 Nov. 9, 2017

(51) Int. Cl.
*H02J 3/00* (2006.01)
*H02J 3/14* (2006.01)
(Continued)

(52) U.S. Cl.
CPC .............. *H02J 3/14* (2013.01); *G05B 13/026* (2013.01); *H02J 3/005* (2013.01); *H02J 3/382* (2013.01); *H02J 2003/003* (2013.01); *H02J 2003/007* (2013.01); *Y02B 70/3225* (2013.01); *Y02E 60/76* (2013.01); *Y04S 20/222* (2013.01); *Y04S 40/22* (2013.01)

(58) Field of Classification Search
CPC .............. G05B 13/026; H02J 2003/003; H02J 2003/007; H02J 3/14
See application file for complete search history.

(56) References Cited

U.S. PATENT DOCUMENTS

| 7,660,649 B1* | 2/2010 | Hope | ..................... | G06Q 10/04 700/28 |
| 2001/0021896 A1* | 9/2001 | Bertsch | ..................... | H02J 3/24 702/62 |

(Continued)

OTHER PUBLICATIONS

Marc Beaudin Marc Beaudin et al., Energy storage for mitigating the variability of renewable electricity sources: An updated review, Energy for Sustainable Development, vol. 14, Issue 4, Dec. 2010, pp. 302-314.

*Primary Examiner* — Yuhui R Pan
(74) *Attorney, Agent, or Firm* — Ahmann Kloke LLP

(57) ABSTRACT

A method for operating a power generating facility connected to a power distribution grid having an uncertain power generation condition includes predicting a probabilistic power flow forecast in a transmission line of the power distribution grid for a period of time, wherein the transmission line is electrically coupled to the power generating facility, predicting, using the probabilistic power flow forecast, a probability of congestion over the transmission line of the power distribution grid during the period of time, generating a mitigation plan, including a load adjustment on the transmission line, using the probability of congestion predicted over the transmission line and a thermal limit constraint of the transmission line, wherein the mitigation plan balances the load adjustment and an overlimit line capacity on the transmission line, and controlling the power generating facility, using the mitigation plan, to achieve the load modification and mitigate the probability of congestion predicted in the transmission line.

16 Claims, 8 Drawing Sheets

(51) Int. Cl.
*H02J 3/38* (2006.01)
*G05B 13/02* (2006.01)

(56) References Cited

U.S. PATENT DOCUMENTS

| | | | |
|---|---|---|---|
| 2011/0172835 A1* | 7/2011 | Imes | G06Q 50/06 |
| | | | 700/287 |
| 2013/0268131 A1 | 10/2013 | Venayagamoorthy et al. | |
| 2014/0343983 A1 | 11/2014 | Narayan et al. | |
| 2015/0230188 A1 | 8/2015 | Festag et al. | |
| 2016/0020609 A1 | 1/2016 | Carrasco et al. | |
| 2016/0043548 A1 | 2/2016 | Bozchalui et al. | |
| 2016/0092986 A1 | 3/2016 | Lian et al. | |

* cited by examiner

CONGESTION CONTROL IN ELECTRIC POWER SYSTEM UNDER LOAD AND UNCERTAINTY

BACKGROUND

The present disclosure relates to power system scheduling and control.

Power systems are typically operated by solving an optimal power flow (OPF) problem. The OPF problem determines an optimal output of power generators at a lowest overall cost to a system operator. The OPF problem is typically modeled using a deterministic forecast. With increasing renewables in the generation mix, variability in net-metered consumers and renewables generation increases. This variability can be significant.

BRIEF SUMMARY

According to an exemplary embodiment of the present invention, a method for operating a power generating facility connected to a power distribution grid having an uncertain power generation condition includes predicting a probabilistic power flow forecast in a transmission line of the power distribution grid for a period of time, wherein the transmission line is electrically coupled to the power generating facility, predicting, using the probabilistic power flow forecast, a probability of congestion over the transmission line of the power distribution grid during the period of time, generating a mitigation plan, including a load adjustment on the transmission line, using the probability of congestion predicted over the transmission line and a thermal limit constraint of the transmission line, wherein the mitigation plan balances the load adjustment and an over-limit line capacity on the transmission line, and controlling the power generating facility, using the mitigation plan, to achieve the load modification and mitigate the probability of congestion predicted in the transmission line.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

real-time monitoring and control of aspects of power parameters, such as voltages, voltage angles, real power and reactive power flowing in each line, and
real-time identification of voltage and thermal limit violations.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
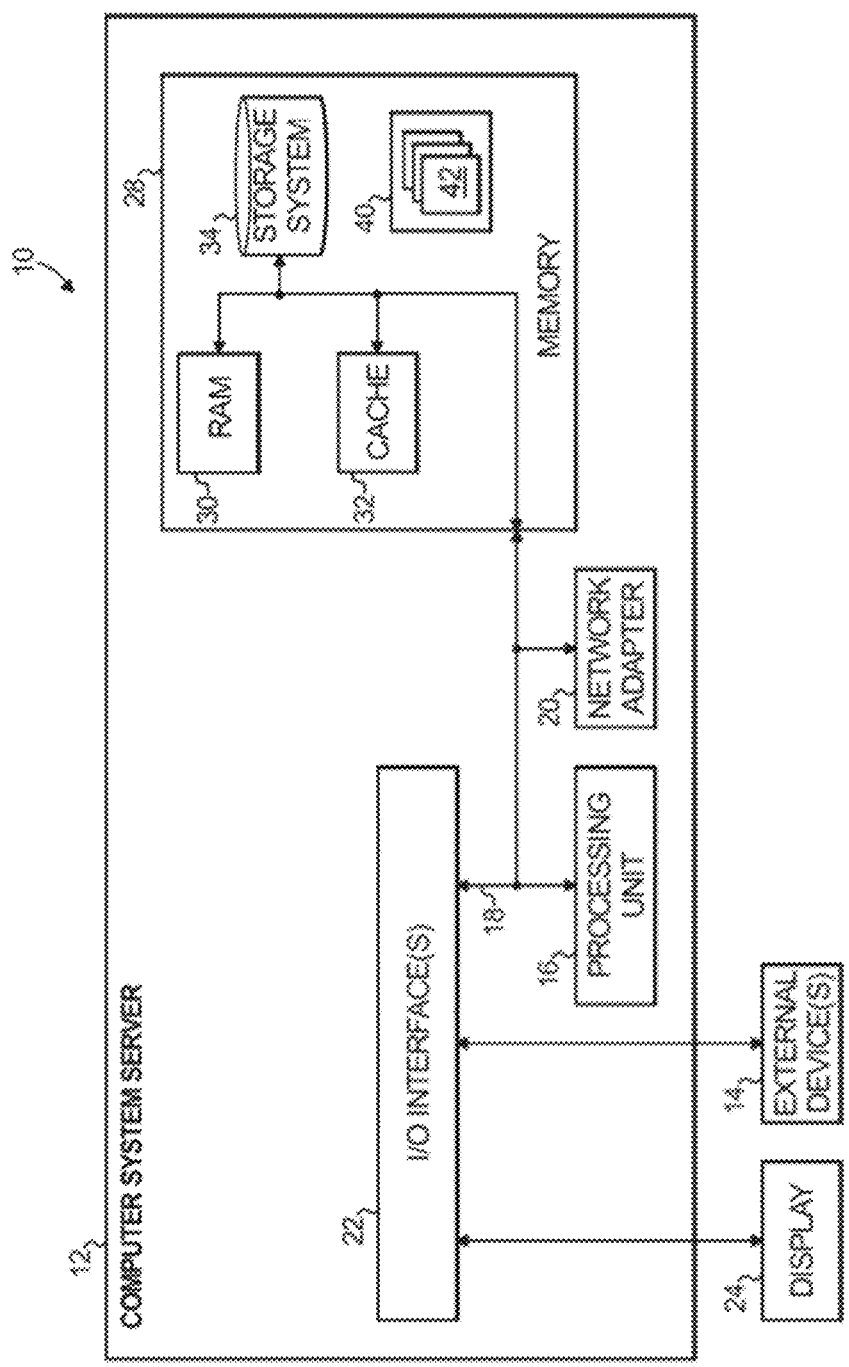
FIG. 1 depicts a cloud computing node according to an embodiment of the present invention.

According to an exemplary embodiment of the present invention, electricity power system scheduling and control is applied for real-time power distribution grid control and day-ahead control. Embodiments of the present invention can be used energy management system (EMS) for power generators and transmission companies. Embodiments of the present invention are directed to methods and systems for predicting power flow, voltage violations and transmission congestion, and providing a congestion mitigation plan for a power system under load and generation uncertainty.

Currently there are no known methods for power system scheduling and control with uncertainty with full alternating current (AC) model. Uncertainty is an increasing concern with the growing use of wind and solar power generators. Such uncertainty leads to increased risk of congestion in the power distribution system, which can manifest along certain transmission lines and/or in certain buses. Congestion in transmission lines leads to overheating and deformation of the transmission lines. It is generally understood that overheating for a period of about 15 minutes or more will lead to permanent deformation, requiring service of the transmission line (e.g., replacement). Congestion at a bus can lead to voltage fluctuations, which can damage connected devices such as personal computers, televisions, etc.

According to an embodiment of the present invention, a system can adapt to predicted congestion. In at least one example, a generator can be asked to decrease output to a power distribution grid. In another example, demand response units disposed along edges of the power distribution grid can be controlled to reduce a load on the power distribution grid (e.g., by decreasing the use of residential air conditioners, or other net-metered consumers) and/or shed load. In yet another example, the power distribution gird itself can be adapted, for example, by releasing transmission lines into the power grid to achieve a change in network topology.

According to an embodiment of the present invention, a power generator connected to a power distribution grid is operated using a stochastic analysis applied along a time horizon to provide look-ahead predictions (e.g., 24-hour), analysis over all contingency cases, and a congestion mitigation plan. According to at least one embodiment of the present invention, the power generator is operated according to a model and conditions including power shortage and surplus scenarios. According to at least one embodiment of the present invention, a multi-period model is used to handle load shedding and stable operation of the power generator(s).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
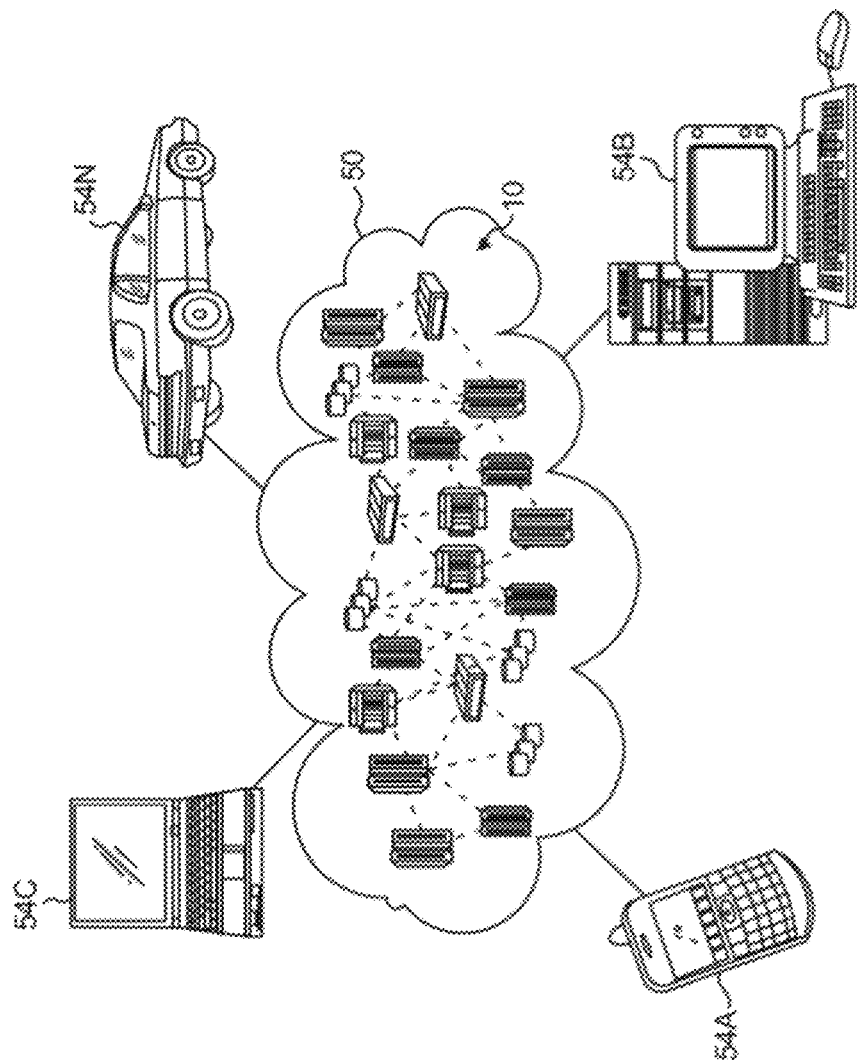
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
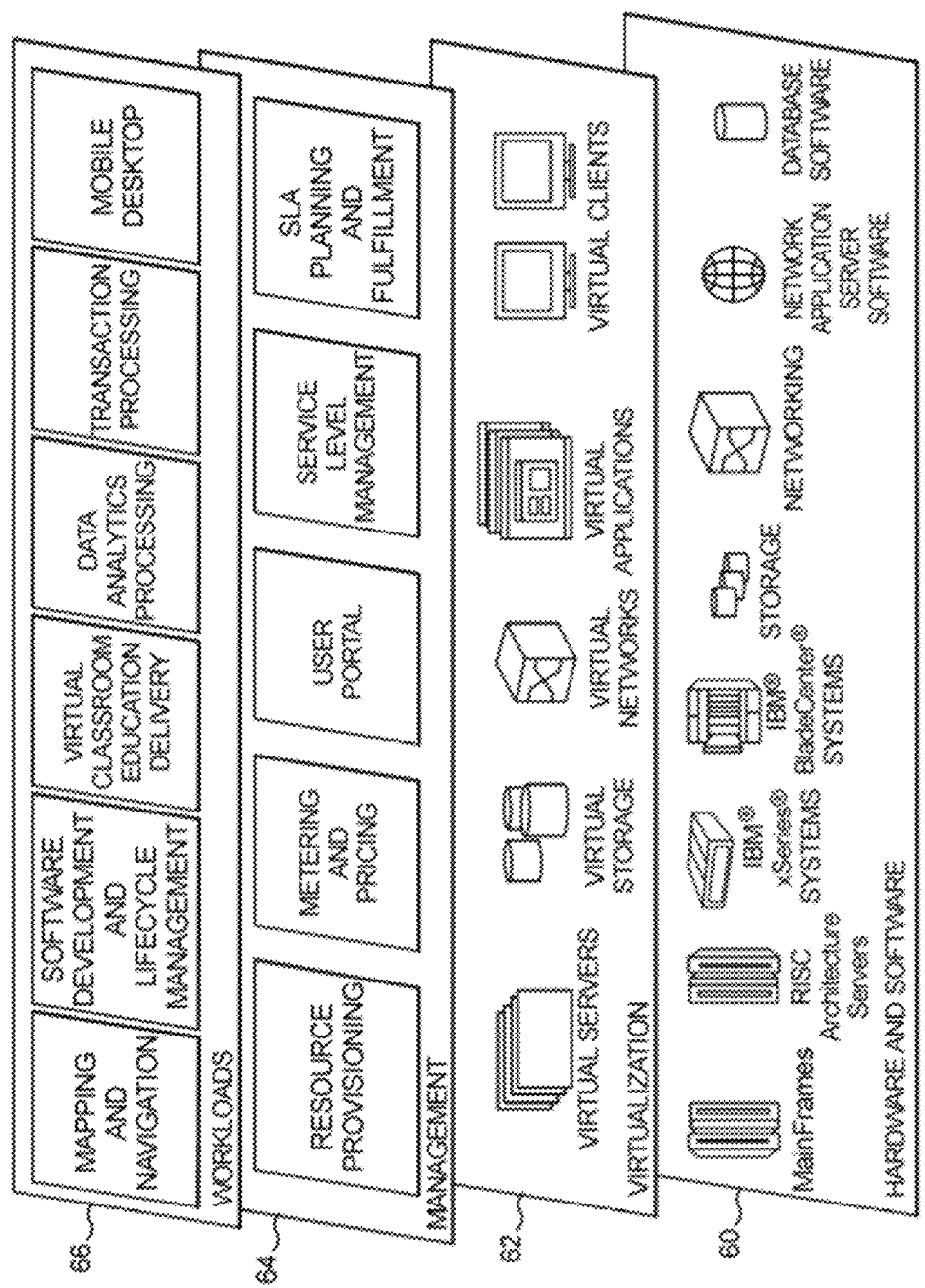
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems;

IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Within this document, variables are defined as follows:
$\mathcal{N}$ set of system buses;
$\mathcal{D}$ set of load buses;
$\mathcal{S}$ set of slack buses;
$\varepsilon$ set of buses for which power can be adjusted;
$\mathcal{G}$ set of schedulable units;
$\mathcal{W}$ set of renewable units;
$\mathcal{L}$ set of branches;
T number of time periods;
v vector of voltage magnitudes;
$\bar{\upsilon}$ vector of base voltage magnitudes;
θ vector of voltage angles;
$p^d$ vector of load real powers;
$q^d$ vector of load reactive powers;
$p^g$ vector of schedulable generation real powers;
$q^g$ vector of schedulable generation reactive powers;
$p^\omega$ vector of renewable real powers;
$q^\omega$ vector of renewable reactive powers;
$p^s$ vector of adjusted real power;
$q^s$ vector of adjusted reactive power;
$s_{ij}$ normal mega-volt amperes (MVA) rating for branch (i; j);
$\bar{u}_{ij}$ emergency MVA rating for branch (i; j);
$\rho_i$ power factor lower limit at bus i;
$P_i(\theta,\upsilon)$ real power injection at bus i;
$Q_i(\theta,\upsilon)$ reactive power injection at bus i;
$P_{ij}(\theta,\upsilon)$ real power flow from bus i to bus j;
$Q_{ij}(\theta,\upsilon)$ reactive power flow from bus i to bus j.

According to an embodiment of the present invention, loads in the equalization zones can be modified in order to satisfy the nodal power balance. To reduce the impact on the system, an operating point is identified with a minimal number of modified load nodes and a small changed amount of power. To achieve this goal, a $l_1$-regularization is used, where the load adjustment is penalized into the objective function by the $l_1$ norm.

The follow description teaches methods for determining the flow of powers for each period separately (single period power flow) and a multi-period formulation.

Figure 4:
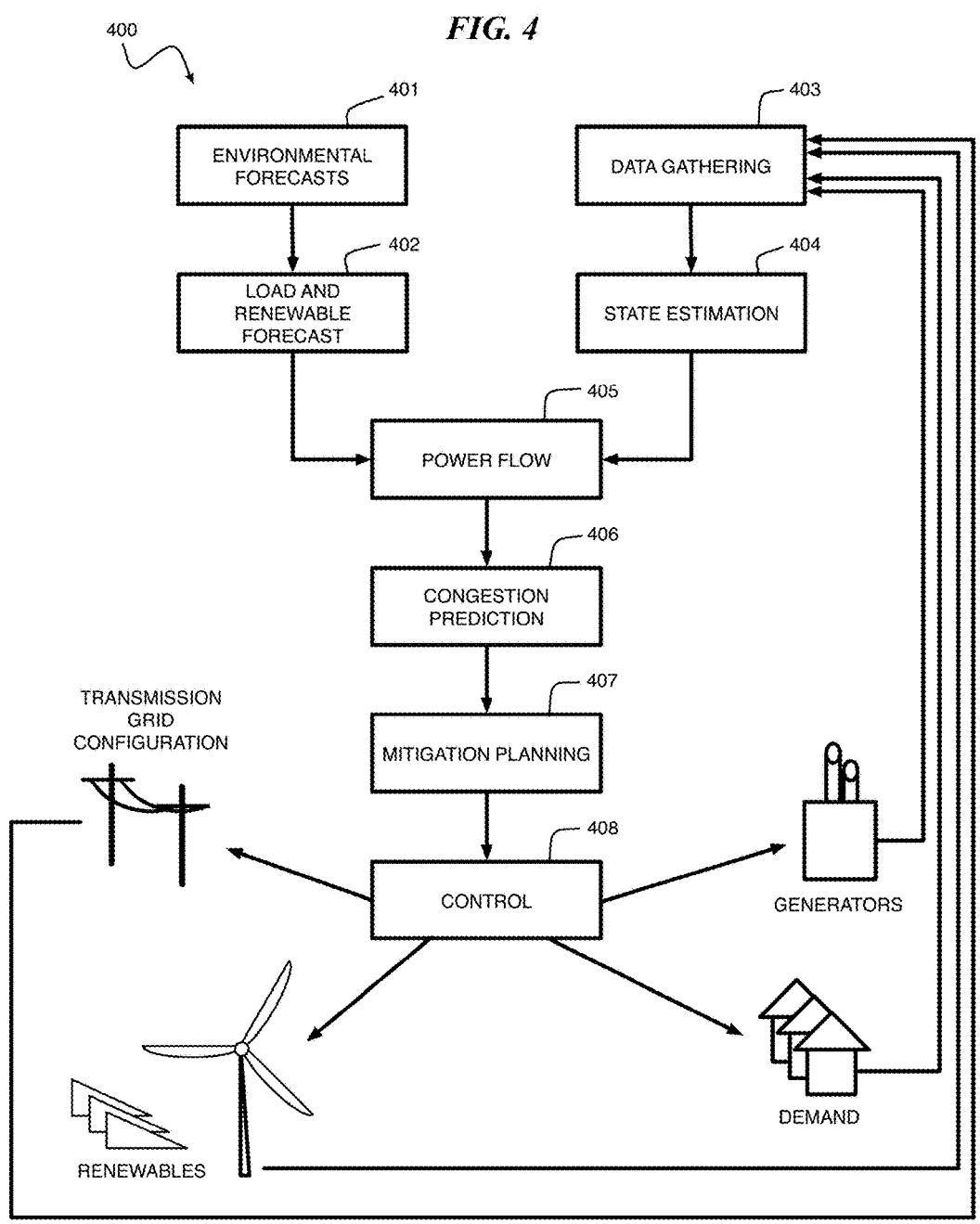
FIG. 4 is an illustration of a distributed algorithm for T machines solving T time periods according to an embodiment of the present invention.

According to an embodiment of the present invention, a system comprising a power flow engine, congestion prediction module, and a control center is configured to perform a method illustrated in FIG. 4. The method comprises making or receiving environmental forecasts 401 (e.g., whether forecasts, wave forecasts, etc.) and making load and renewable energy forecasts 402 using the environmental forecasts. The method further comprises observing a power distribution grid 403 (e.g., using sensors placed in nodes or links between the nodes in the power distribution grid) and estimating a current state of the power distribution grid 404 given observed data about the power distribution grid. The method comprises executing a power flow engine 405 using the load and renewable energy forecasts and the current state of the power distribution grid to predict power flow in the power distribution grid. The predicted power flow is used to predict congestion in power distribution grid, including along particular transmission lines and at certain buses. A mitigation plan is generated 407 using the predicted congestion, wherein the mitigation plan is implemented by the control center. The control center takes control actions 408 to mitigate the predicted congestion events. Control devices, demand response units, and the like are deployed to change characteristics of the nodes or the links between the nodes, control power generators to increase or reduce power, reduce power useable, etc.

According to an embodiment of the present invention, a stochastic AC power flow can be controlled according to the following:

min=load shedding+over thermal limit
such that (s.t.) $P_k(V,\delta)=P_g-P_d-P_{loadshedding}$;
$Q_k(V,\delta)=Q_g-Q_d-Q_{loadshedding}$;
thermal limit constraints;
load shedding constraints; and
operating limits.

The stochastic optimization problem reduces total load shedding power (e.g., Mega Watts), reduces a total number of load shedding buses and reduces line congestion. It should be noted that determination is under-constrained where the number of equations is less than the number of variables.

Single-period Power Flow

According to an embodiment of the present invention, an operating point is determined that reduces (e.g., minimizes) a total absolute load shedding, a number of load shaded buses, and over thermal limits as follows (model for single-period). According to an embodiment of the present invention, a mathematical minimization problem for each time period can be formulated without any coupling constraints with other periods, where values for real power demand $p_i^d$ and renewable generation $p_i^w$ are given from a sampling scheme for their statistical distributions. Schedulable generations $p_i^g$ are provided from the ISO. This information is not sufficient to run a classical power flow tool. According to an embodiment of the present invention, an operating point is found with a reduced (e.g., minimal) load adjustment, overlimit line capacity, and voltage violations by considering the solution of the following optimization problem:

$$\min_{\substack{\theta,v,p^s,q^s,q^d,u,\\ q^g,q^w,p_i^g(i\in S)}} \sum_{i\in\mathcal{E}}|p_i^s| + c_1\sum_{(i,j)\in\mathcal{L}} u_{ij} + c_2\sum_{i\in\mathcal{N}}(v_i - \bar{v}_i)^2 \quad (1a)$$

$$\text{s.t.}\quad P_i(\theta,v) + p_i^d + p_i^s - p_i^g - p_i^w = 0 \;\forall\, i\in\mathcal{N} \quad (1b)$$

$$Q_i(\theta,v) + q_i^d + q_i^s - q_i^g - q_i^w = 0 \;\forall\, i\in\mathcal{N} \quad (1c)$$

$$P_{ij}^2(\theta,v) + Q_{ij}^2(\theta,v) - \bar{s}_{ij} \le u_{ij} \;\forall\, (i,j)\in\mathcal{L} \quad (1d)$$

$$p_i^s q_i^d - q_i^s p_i^d = 0 \;\forall\, i\in\mathcal{E} \quad (1e)$$

$$|q_i^d| \le |p_i^d|\sqrt{(1-\rho_i^2)/\rho_i^2} \;\forall\, i\in\mathcal{D} \quad (1f)$$

$$\underline{p}_i^g \le p_i^g \le \bar{p}_i^g \;\forall\, i\in\mathcal{S} \quad (1g)$$

$$\underline{q}_i^g \le q_i^g \le \bar{q}_i^g \;\forall\, i\in\mathcal{G}\cup\mathcal{W} \quad (1h)$$

$$\underline{v}_i \le v_i \le \bar{v}_i \;\forall\, i\in\mathcal{N} \quad (1i)$$

$$0 \le u_{ij} \le \bar{u}_{ij} \;\forall\, (i,j)\in\mathcal{L} \quad (1j)$$

$$\underline{p}_i^s \le p_i^s \le \bar{p}_i^s \;\forall\, i\in\mathcal{E}. \quad (1k)$$

The first term in the objective function (1a) is the total absolute values of load modification at the equalization zones $\varepsilon$, which is the $l_1$ norm of $p^s$. The second one is the aggregation of the line limit violations, which is related to the line thermal limit constraint (1d). The third term is the total voltage deviation from the base values. The last two terms are weighted by positive parameters $c_1$ and $c_2$. Constraints (1b) and (1c) are the AC power balance equations. We assume that $p_i^d=0$ if $d\notin D$. Similarly, there holds for $p_i^s$, $p_i^g$, $p_i^w$, etc. In some stressed scenarios, it may be impossible to dispatch without exceeding the normal thermal capacity unless a significant load shedding is taken. Embodiments of the present invention allow a moderate over-capacity by imposing a soft constraint in (1d) and a hard constraint in (1j). Constraint (1e) is derived from the constant power factor assumption for demands:

$$\frac{p_i^d}{q_i^d} = \frac{p_i^d - p_i^s}{q_i^d - q_i^s}.$$

Since $q_i^d$ is unknown, a demand for reactive power should give rise to a power factor above some pre-specified limit $\rho_i$:

$$\frac{|p_i^d|}{\sqrt{(p_i^d)^2 + (q_i^d)^2}} \ge \rho_i,$$

which is rewritten as in (1f) with a constant parameter on the right-hand side. Slack buses are used to balance real power in the network, where the outputs are limited in (1g). Constraint (1h) enforces bounds on the reactive power generations. A proposed solution can be operational in cases where the voltage and thermal capacity violations are still in acceptable ranges, which are represented by (1i) and (1j).

Constraint (1k) ensures that load adjustments are within pre-specified limits satisfying $\underline{p}_i^s \le 0 \le \bar{p}_i^s$.

According to an embodiment of the present invention, the $l_1$ regularization (non-differentiable) is reformulated as a differentiable problem with new variables $p_{up}$ and $p_{dw}$:

$$\min_{\substack{\theta,v,p_{up},p_{dw},q^s,\\ q^d,u,q^g,q^w,p_i^g}} \sum_{i\in\mathcal{E}}(p_{up,i} + p_{dw,i}) + c_1\sum_{(i,j)\in\mathcal{L}} u_{ij} + c_2\sum_{i\in\mathcal{N}}(v_i - \bar{v}_i)^2 \quad (2a)$$

$$\text{s.t.}\quad P_i(\theta,v) + p_i^d + p_{up,i} - p_{dw,i} - p_i^g - p_i^w = 0 \;\forall\, i\in\mathcal{N} \quad (2b)$$

$$(p_{up,i} - p_{dw,i})q_i^d - q_i^s p_i^d = 0 \;\forall\, i\in\mathcal{E} \quad (2c)$$

$$0 \le p_{dw} \le |\underline{p}^s| \quad (2d)$$

$$0 \le p_{up} \le \bar{p}^s \quad (2e)$$

$$(1c), (1d), (1f) - (1j).$$

Existing optimization algorithms based on interior-point methods such as IPOPT and KNITRO can efficiently solve the nonlinear minimization problem (2). In the rectangular coordinates, where the voltage at a bus i represented as $e_i + jf_i$, j is the imaginary unit, the model (2) is a quadratically constrained quadratic program, a fundamental problem in optimization. Then, the probabilistic description of power flows and voltage violations can be obtained by Monte Carlo simulation.

Multi-period Power Flow

In a case where the power flow on a transmission line exceeds the normal thermal limit, for example 250 MVA over a line rated for 200 MVA service, to avoid overheating, the same level of violation should be avoided in the next several periods. By analogy, the voltage violation at a given bus should be gradually reduced, for example, by temporarily shifting the issue to other buses. To maintain a measure of fairness between customers, the magnitude of load shedding at a location should also be decreased. These features are considered when calculating power flow for each period over a forecast horizon. The following constraint is used to couple consecutive periods:

$$y^t(y^{t+1}-\alpha y^t)\le 0, \quad (3)$$

where $y^t \ge 0$ is the amount of violation or load adjustment at period t and $0<\alpha<1$ is the reduction ratio. Inequality (3) states that if $y^t=0$ then there is no additional constraint for $y^{t+1}$. However, if $y^t>0$ then $y^{t+1}$ is reduced by $\alpha y^t < y^t$. Stated another way, inequality (3) states that if a customer is negatively affected in any period, then that customer cannot be accessed in the next period. In this context, coupling can be considered a customer satisfaction constraint.

Denote $\Delta v$ by the voltage deviation threshold. When the change of voltage from the base case is larger than this value, it is regarded as a violation and voltage should be mitigated into a desired range. The following constraint $$|v-\bar{v}|-\Delta v \le \nu, \nu \ge 0 \quad (4)$$

is used to measure the amount of voltage surpassing the desired threshold. A modified single-period formulation is written as:

$$\min_{\substack{\theta,v,p_{up},p_{dw},q^s,\\ q^d,u,q^g,q^w,p_i^g,\nu}} \sum_{i\in\mathcal{D}}(p_{up,i} + p_{dw,i}) + c_1\sum_{(i,j)\in\mathcal{L}} u_{ij} + c_2\sum_{i\in\mathcal{N}} \nu_i \quad (5a)$$

-continued $$\text{s.t. } |v_i - \overline{v}_i| - \Delta v_i \leq v_i \ \forall i \in \mathcal{N} \tag{5b}$$

$$0 \leq v \tag{5c}$$

$$(1c), (1d), (1f) - (1j), (2b) - (2e). \tag{5}$$

In this formulation, undesired voltage deviations from the threshold are also minimized. This is treated in the same manner with the load shedding and thermal limit violation, wherein periods are mathematically linked. Expressing (5) in a compact form:

$$\min_{x, p_{up}, p_{dw}, u, v} f(x) + c_1 \sum_{(i,j) \in \mathcal{L}} u_{ij} + c_2 \sum_{i \in \mathcal{N}} v_i \tag{6a}$$

$$(x, p_{up}, p_{dw}, u, v) \in \Lambda, \tag{6b}$$

where $x = (\theta, v, q^s, q^d, q^g, q^w, p^g_{i \in s})$.

According to an embodiment of the present invention, a multi-period day-ahead power flow analysis formulation with T periods for time-varying load and generation with the violation reduction condition (3) is given as follows:

$$\min_{\substack{x^t, p_{up}^t, p_{dw}^t \\ u^t, v^t}} \sum_{t=1}^{T} \left( f^t(x^t) + c_1 \sum_{(i,j) \in \mathcal{L}} u_{ij}^t + c_2 \sum_{i \in \mathcal{N}} v_i^t \right) \tag{7a}$$

$$\text{s.t. } (x^t, p_{up}^t, p_{dw}^t, u^t, v^t) \in \Lambda^t, \forall t = 1, \ldots, T \tag{7b}$$

$$u_{i,j}^t(u_{i,j}^{t+1} - \alpha_u u_{i,j}^t) \leq 0, \forall (i,j) \in \mathcal{L}, t = 0, \ldots, T-1 \tag{7c}$$

$$p_{dw}^t(p_{dw}^{t+1} - \alpha_{p_{dw}} p_{dw}^t) \leq 0, \forall t = 0, \ldots, T-1 \tag{7d}$$

$$p_{up}^t(p_{up}^{t+1} - \alpha_{p_{up}} p_{up}^t) \leq 0, \forall t = 0, \ldots, T-1 \tag{7e}$$

$$v_i^t(v_i^{t+1} - \alpha_v v_i^t) \leq 0, \forall i \in \mathcal{N}, t = 0, \ldots, T-1. \tag{7f}$$

For some $0 < \alpha_u, \alpha_{p_{dw}}, \alpha_{p_{up}}, \alpha_v < 1$. Constraint (7c) means that if the apparent power flow is branch (i,j) at time t exceeds the limit an amount of $u_{i,j}^t$, then the over line limit $u_{i,j}^{t+1}$ for the next period t+1 has to be reduced at least by $\alpha_u u_{i,j}^t$. The same mechanism is applied for the load adjustments $p_{dw}^t$ and $p_{up}^t$ as shown in (7d) and (7e) and the voltage violation $v^t$ in (7f). At t=0, the values of $(p_{up}^t, p_{dw}^t, u^t, v^t)$ are the known solutions from the latest period, i.e., right before the first scheduling time t=1. The constraint set $\Lambda^t$ can be different for each period t because of, for example, the change of network topology by transmission switching or the decommitted units.

Define $z^t = (p_{up}^t, p_{dw}^t, u^t, v^t)$ and $\alpha = (\alpha_{p_{up}}, \alpha_{p_{dw}}, \alpha_u, \alpha_v)$ and new variables $s_-^t$, $s^t$ and $s_+^t$ for each period t, which are used to store copies of $z^t$. Then reformulate the multi-period model (7) as:

$$\min \sum_{t=1}^{T} \left( f^t(x^t) + c_1 \sum_{(i,j) \in \mathcal{L}} u_{i,j}^t + c_2 \sum_{i \in \mathcal{N}} v_i^t \right) \tag{8a}$$

$$(x^t, s^t) \in \Lambda^t, \ \forall t = 1, \ldots, T \tag{8b}$$

$$s^t \odot (s_+^t - \alpha \odot s^t) \leq 0, \ \forall t = 1, \ldots, T-1 \tag{8c}$$

$$s_-^t \odot (s^t - \alpha \odot s_-^t) \leq 0, \ \forall t = 1, \ldots, T \tag{8d}$$

$$s_+^t = z^{t+1}, \ \forall t = 1, \ldots, T-1 \tag{8e}$$

$$s^t = z^t, \ \forall t = 1, \ldots, T \tag{8f}$$

$$s_-^t = z^{t-1}, \ \forall t = 1, \ldots, T. \tag{8g}$$

Here $\odot$ denotes component-wise multiplication. At period t, the constraints (8c) and (8e) are used to link with period t+1, and the coupling conditions between periods t and t−1 are expressed by (8d) and (8g).

According to an embodiment of the present invention, an augmented Lagrangian function is written as:

$$L_\beta(x, y, z, \lambda) = \sum_{t=1}^{T} \left( f^t(x^t) + c_1 \sum_{(i,j) \in \mathcal{L}} u_{i,j}^t + c_2 \sum_{i \in \mathcal{N}} v_i^t \right) +$$

$$\sum_{t=2}^{T} \left( (\lambda_-^t)^T (s_-^t - z^{t-1}) + \frac{\beta}{2} \|s_-^t - z^{t-1}\|^2 \right) +$$

$$\sum_{t=1}^{T} \left( (\lambda^t)^T (s^t - z^t) + \frac{\beta}{2} \|s^t - z^t\|^2 \right) +$$

$$\sum_{t=1}^{T-1} \left( (\lambda_+^t)^T (s_+^t - z^{t+1}) + \frac{\beta}{2} \|s_+^t - z^{t+1}\|^2 \right)$$

where $\beta > 0$ and $$y = (v_-^t, v^t, v_+^t : t = 1, \ldots, T)$$

$$\lambda = (\lambda_-^t, \lambda^t, \lambda_+^t : t = 1, \ldots, T).$$

Let $\Omega^t$ be the constraint set defined by equations (8b-7d). The alternating direction method of multipliers (ADMM) is a first-order primal-dual algorithm, which alternately optimizes the augmented Lagrangian $L_\beta$. In power system analysis, this method has been successfully applied to a number of optimization problems such as the classical optimal power flow (OPF) problem and the security constrained OPF. According to an embodiment of the present invention, a decomposition algorithm based on ADMM for solving (8), a multi-period model, is written as:

DECOMPOSITION ALGORITHM (9)

Initialize $k = 0$, $\beta > 0$, and starting points $z^{t(0)}$ and $\lambda^{t(0)}$.
1. x-update step
For $t = 1$:

$$(x^{1(k+1)}, y^{1(k+1)}) = \operatorname{argmin}_{(x^1, y^1) \in \Omega^1} f^1(x^1) + (\lambda^{1(k)})^T (s^1 - z^{1(k)}) +$$

$$(\lambda_+^{1(k)})^T (s_+^1 - z^{2(k)}) + \frac{\beta}{2} \left( \|s^1 - z^{1(k)}\|^2 + \|s_+^1 - z^{2(k)}\|^2 \right)$$

For $t = 2, \ldots, T-1$: (10)

$$(x^{t(k+1)}, y^{t(k+1)}) = \operatorname{argmin}_{(x^t, y^t) \in \Omega^t} f^t(x^t) +$$

$$(\lambda_-^{t(k)})^T (s_-^t - z^{t-1(k)}) + (\lambda^{t(k)})^T (s^t - z^{t(k)}) + (\lambda_+^{t(k)})^T (s_+^t - z^{t+1(k)}) +$$

$$\frac{\beta}{2} \left( \|s_-^t - z^{t-1(k)}\|^2 + \|s^t - z^{t(k)}\|^2 + \|s_+^t - z^{t+1(k)}\|^2 \right)$$

$$(x^{T(k+1)}, y^{T(k+1)}) = \operatorname{argmin}_{(x^T, y^T) \in \Omega^T} f^T(x^T) + (\lambda_-^{T(k)})^T (s_-^T - z^{T-1(k)}) + \tag{11}$$

$$(\lambda^{T(k)})^T (s^T - z^{T(k)}) + \frac{\beta}{2} \left( \|s_-^T - z^{T-1(k)}\|^2 + \|s^T - z^{T(k)}\|^2 \right)$$

-continued 2. z-update step (12)

For $t = 1$:

$z^{1(k+1)} =$ $\text{argmin}_{z^1 \geq 0, \overline{u}^1 \geq u^1} c_1 \sum_{(i,j) \in \mathcal{L}} u_{i,j}^1 + c_2 \sum_{i \in N} v_i^1 + (\lambda_-^{2(k)})^T (s_-^{2(k+1)} - z^1) +$ $(\lambda^{1(k)})^T (s^{1(k+1)} - z^1) + \frac{\beta}{2} \left( \|s_-^{2(k+1)} - z^1\|^2 + \|s^{1(k+1)} - z^1\|^2 \right)$ $z^{t(k+1)} =$ (13)

$\text{argmin}_{z^t \geq 0, \overline{u}^t \geq u^t} c_1 \sum_{(i,j) \in \mathcal{L}} u_{i,j}^t + c_2 \sum_{i \in N} v_i^t + (\lambda_-^{t+1(k)})^T (s_-^{t+1(k+1)} - z^t) +$ $(\lambda^{t(k)})^T (s^{t(k+1)} - z^t) + (\lambda_+^{t-1(k)})^T (s_+^{t-1(k+1)} - z^t) +$ $\frac{\beta}{2} \left( \|s_-^{t+1(k+1)} - z^t\|^2 + \|s^{t(k+1)} - z^t\|^2 \|s_+^{t-1(k+1)} - z^t\|^2 \right)$ $z^{T(k+1)} =$ (14)

$\text{argmin}_{z^T \geq 0, \overline{u}^T} c_1 \sum_{(i,j) \in \mathcal{L}} u_{i,j}^T + c_2 \sum_{i \in N} v_i^T + (\lambda^{T(k)})^T (s^{T(k+1)} - z^T) +$ $(\lambda_+^{T-1(k)})^T (s_+^{T-1(k+1)} - z^T) + \frac{\beta}{2} \left( \|s^{T(k+1)} - z^T\|^2 + \|s_+^{T-1(k+1)} - z^T\|^2 \right)$ 3. Update multipliers (15)
$\lambda_+^{t(k+1)} = \lambda_+^{t(k)} + \beta(s_+^{t(k+1)} - z^{t+1(k+1)}), t = 1, \ldots, T-1$
$\lambda^{t(k+1)} = \lambda^{t(k)} + \beta(s^{t(k+1)} - z^{t(k+1)}), t = 1, \ldots, T$
$\lambda_-^{t(k+1)} = \lambda_-^{t(k)} + \beta(s_-^{t(k+1)} - z^{t-1(k+1)}), t = 2, \ldots, T$ 4. Set $k = k + 1$.

Until a stopping criterion is satisfied.

According to an embodiment of the present invention, in the x-update step, there are T independent OPF-type problems, which can be solved in parallel. In the z-update step, there are also T separate convex quadratic programs with a box constraint.

A distributed algorithm 500 for a computer network consisting of T machines with a message-passing mechanism (see also FIG. 5) is described as follows:

Initialization
  Each machine t initialized $z^{t(0)} = z^0$, $\lambda^{t(0)} = 0$, $\beta = 1$, $k = 0$;
  Machine 1 sends $z^{1(k)}$ to machine 2;
  Machine t sends $z^{t(k)}$ to machines $t-1$ and $t+1$, $(1 < t < T)$;
  Machine T sends $z^{T(k)}$ to machine T-1.
Repeat
1. Each machine t solves the corresponding problem (9)-(11) to get $(s_-^t, s^t, s_+^t)^{(k+1)}$.
2. Machine t sends $\lambda_+^{t(k)}$ and $s_+^{t(k+1)}$ to machine t+1, $(1 \leq t < T)$;
  Machine t sends $\lambda_-^{t(k)}$ and $s_-^{t(k+1)}$ to machine t-1, $(1 < t \leq T)$.
3. Each machine t solves the corresponding problem (12)-(14) to get $z^{t(k+1)}$.
4. Machine 1 sends $z^{1(k+1)}$ to machine 2;
  Machine t sends $z^{t(k+1)}$ to machine t-1 and t+1, $(1 < t < T)$;
  Machine T sends $z^{T(k+1)}$ to machine T-1.
5. Each machine t computes $\lambda_-^{t(k+1)}$, $\lambda^{t(k+1)}$, and $\lambda_+^{t(k+1)}$ using (15).

Until a stopping criterion is satisfied.

Figure 5:
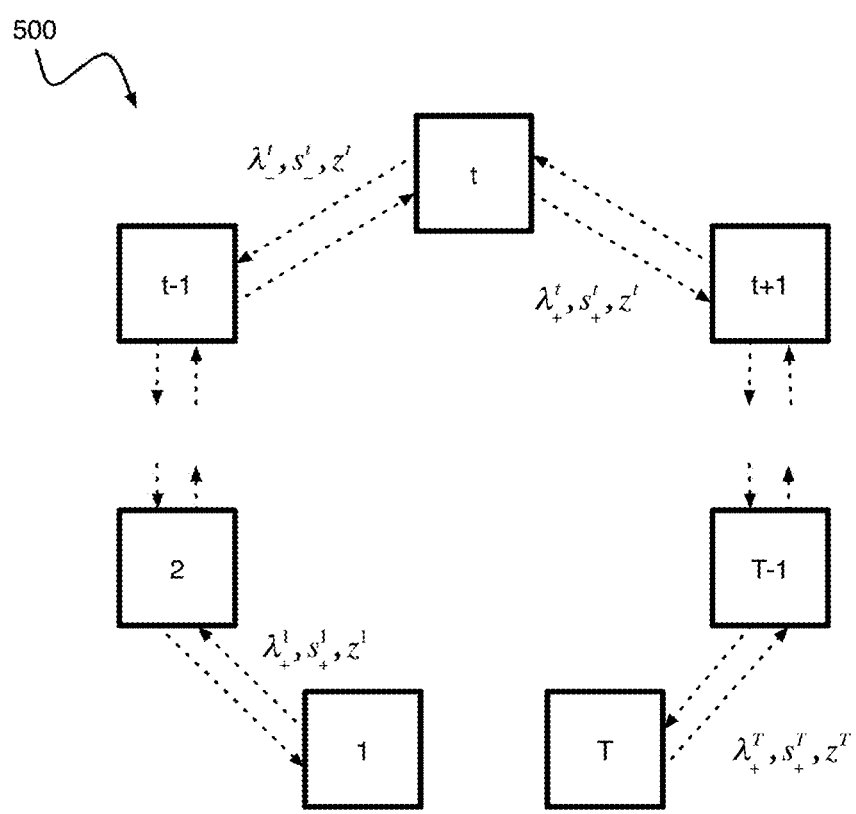
FIG. 5 is an illustration of a method for controlling a power generation system according to an embodiment of the present invention.

FIG. 5 depicts the information exchanging between machines. Machine t sends its load modification, thermal and voltage limit violations, and its prediction of these values of neighbors together with associated dual values to neighbors. The amount of transferred data is small. Note that, at Step 1, there is neither $s_-^{1(k+1)}$ for machine 1, nor $s_+^{T(k+1)}$ for machine T. If the network has less than T machines, some machine needs to solve multiple sub-problems for different time periods. The distributed algorithm can be modified for other scenarios.

Probabilistic Estimation

Congestion in the electrical grid happens when there is a violation of either the prescribed line flow limits ($u_{i,j}^t > 0$ for some branch (i,j) in some period t) of the voltage limits ($v_i^t > 0$ at some bus i in some period t). Suppose $\mathcal{T}_{i,j}$ and $\mathcal{T}_i$ are the first period when the quantities $u_{i,j}^t$ and $v_i^t$ are positive. The first quantity of interest is the probability of an occurrence at least one such event before the end of the horizon T:

$\alpha = P(\cup_i \{ \mathcal{T}_i \leq T \} \cup_{(i,j)} \{ \mathcal{T}_{i,j} \leq T \})$ Such events are rare in occurrence, and so a crude Monte-Carlo scenario can be computationally expensive. To understand why, consider the relative variance of the crude estimator, i.e., the variance of the estimator $(\alpha(1-\alpha))/n$ as obtained from n trials of a standard Bernoulli (whether a sampled 24-hr scenario led to congestion or not), divided by the square of estimator itself $\alpha^2$. The standard estimation procedure samples until the relative accuracy of the estimator falls within a pre-specified bound; in such a case the number of sample scenarios needed tends to infinity under a crude sampling scheme, e.g., $\alpha \to 0$.

A reduced-variance estimator is needed in such rare-event circumstances. An importance-splitting approach is used in the estimation. Splitting applies stratified sampling to time-indexed processes, and starts by defining an importance function $h_\alpha(t) \geq 0$ such that $h_\alpha(t) \geq 1$ when at least one of $u_{i,j} > 0$ or $v_{i,j} > 0$ occurs. The function $h_\alpha$ is considered the "proximity" of the current sample path to the events of interest (congestion in this case). The procedure works as follows. Divide [0; 1] into levels $0 = l_0 \leq l_1 \ldots \leq l = 1$. Define first visit times $L(l) = \min\{t | h_\alpha(t) \geq l\}$. Define event D(l) that level l is visited before T, i.e., $D(l) = \{L_l \leq T\}$. Then, $P(D(1)) = \alpha$, the event that congestion occurs, and so:

$$\alpha = \prod_{k=1}^{K} P(D(l_k) | D(l_{k-1}))$$

The splitting approach adaptively estimates each of these conditional probabilities. For example, sample scenarios are generated to first hit the event $D(l_1)$, and then further scenarios are generated from those scenarios that reach $l_1$ in order to observe how many reach level $l_2$, i.e. call in the event $D(l_2)$. This carries forth till k=K, and a sequence of sample scenarios have been generated that lead to congestion. The manner in which scenarios are sample sequentially needs to be carefully setup, but if done correctly can yield a relative variance $\sim (\log \alpha)^2$, which is much slower than the crude Monte Carlo approach.

This splitting approach can be extended to cover the estimation of other quantities of interest such as the conditional exceedence of voltage, the power flow above the prescribed limits, etc., once appropriate sample scenarios have been identified.

Figure 6:
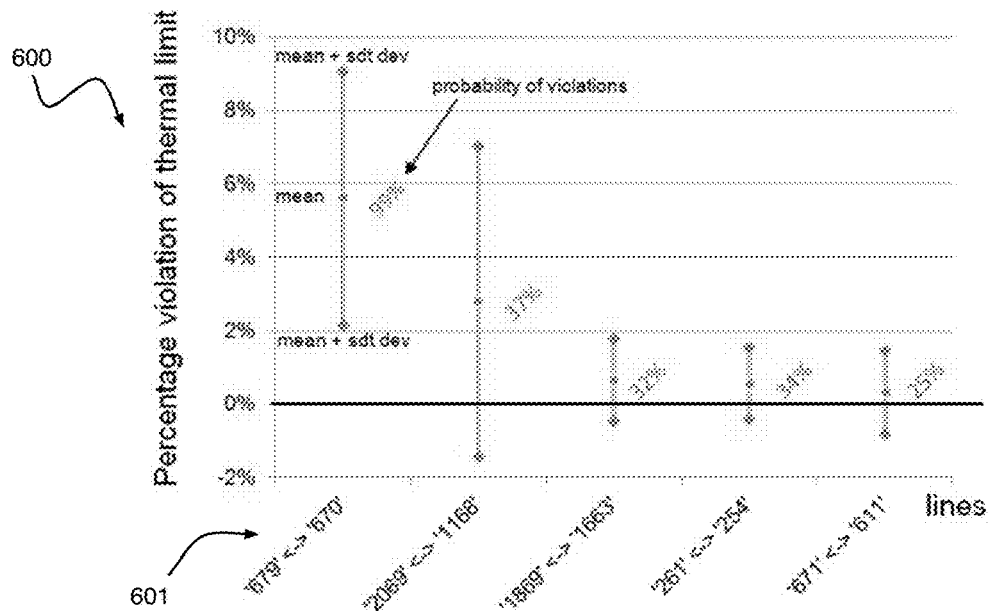
FIG. 6 is a graph illustrating the mean, standard deviation, and the probability of some line thermal limit violations for an exemplary network according to an embodiment of the present invention.

FIG. 6 is a graph 600 illustrating the mean, standard deviation, and the probability of some line thermal limit violations for an exemplary network with 1000 sampled scenarios in the decreasing order of the mean values. The value for "scale" is 1. The line connecting bus numbers 670 and 679 (601) is almost always violated with a probability of 99%.

Figure 7:
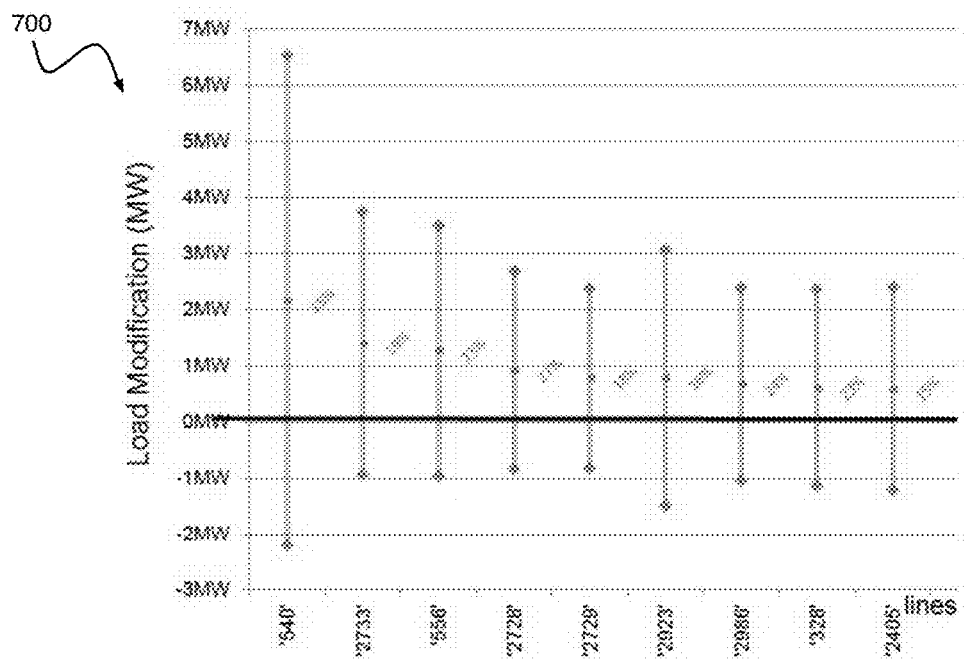
FIG. 7 is a graph showing exemplary load modifications according to an embodiment of the present invention.

FIG. 7 is a graph 700 showing exemplary load modifications together with the probability at buses. For nouncertainty case, network has sufficient slack generation capacity, i.e., no load adjustments. With uncertainty included, the slack buses are insufficient in about 30.6% of scenarios.

Figure 8:
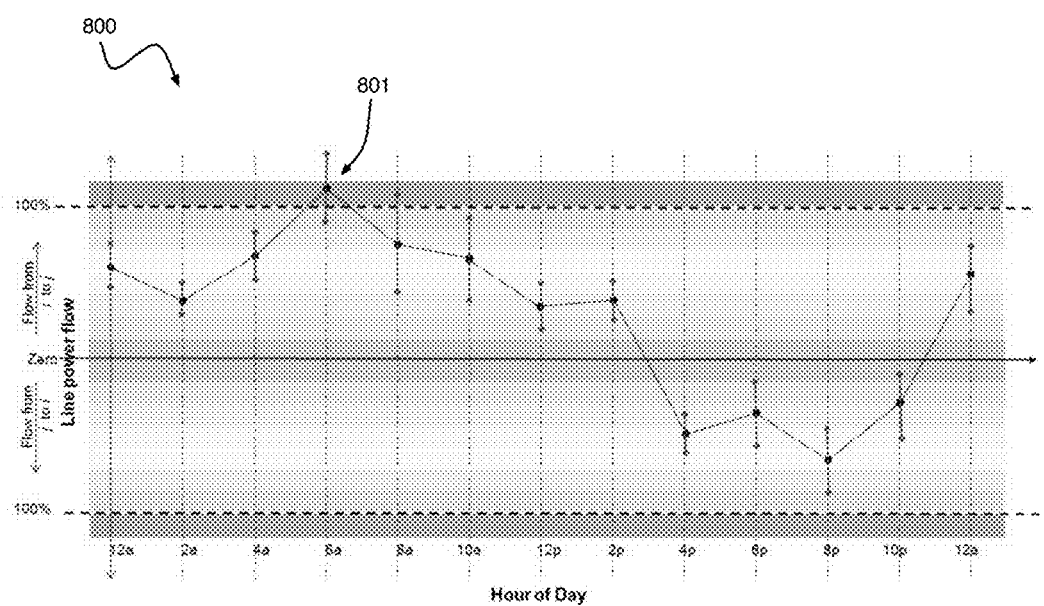
FIG. 8 is a graph showing power flows throughout a given period according to an embodiment of the present invention.

FIG. 8 is a graph 800 showing power flows throughout a day for a given transmission line with 1000 sampled scenarios. At 4-th time period 801, the thermal line limit is violated with a high possibility of 92%. Note also, that between the 8-th and 9-th time periods and between the 12-th and 13-th time periods, that the direction of the current over the transmission line is switched (i.e., the transmission grid is re-configured) as part of a daily schedule.

Recapitulation

According to an embodiment of the present invention, a power distribution grid is adapted using a model, which generates a prediction of risk of congestion in an electricity grid due to the presence of sources of uncertainty in the form of renewable generation. Embodiments of the present invention include a) multi-period power flow model that provides a realistic representation of congestion mitigation actions from limited capacity fatigue-prone assets such a demand-response, b) an efficient distributed computation procedure to solve the multi-period model quickly, and c) an importance-splitting-based rare-event simulation procedure to efficiently estimate the risk of experiencing a congestion event and other related metrics. Embodiments of the present invention include adapting the power distribution grid by decreasing output (i.e., generation), controlling demand response units disposed along edges of the power distribution grid to reduce a load of the power distribution grid, and reconfiguring a network topology of the power grid (e.g., by releasing transmission lines into the power grid to achieve a change in network topology).

According to an embodiment of the present invention, a method for operating a power generating facility connected to a power distribution grid having an uncertain power generation condition includes predicting a probabilistic power flow forecast in a transmission line of the power distribution grid for a period of time, wherein the transmission line is electrically coupled to the power generating facility, predicting, using the probabilistic power flow forecast, a probability of congestion over the transmission line of the power distribution grid during the period of time, generating a mitigation plan, including a load adjustment on the transmission line, using the probability of congestion predicted over the transmission line and a thermal limit constraint of the transmission line, wherein the mitigation plan balances the load adjustment and an overlimit line capacity on the transmission line, and controlling the power generating facility, using the mitigation plan, to achieve the load modification and mitigate the probability of congestion predicted in the transmission line.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for power system scheduling and control. Further, a computer program product can include a tangible computer-readable recordable storage medium with code adapted to be executed to carry out one or more method steps described herein, including the provision of the system with the distinct software modules.

Figure 9:
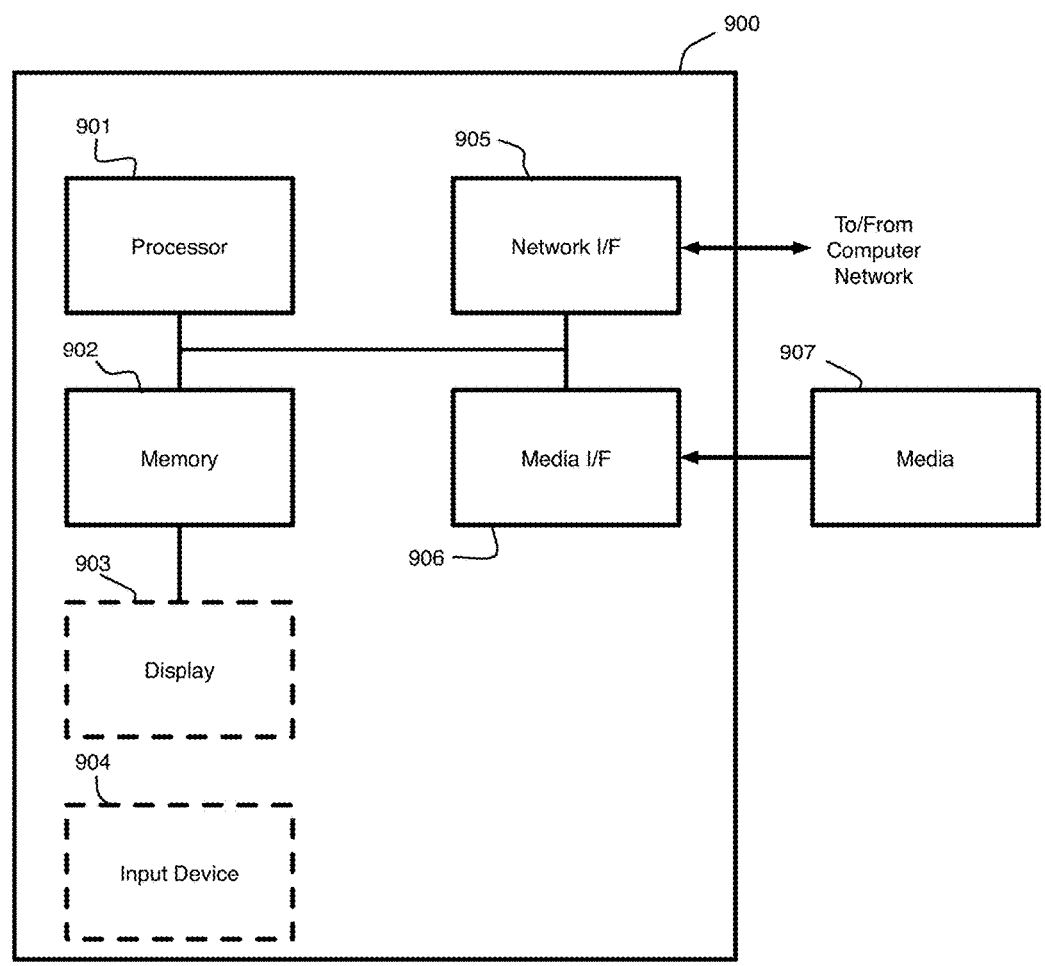
FIG. 9 is a block diagram depicting an exemplary computer system embodying a method for analyzing an image using a policy function according to an exemplary embodiment of the present invention.

Referring to FIG. 9; FIG. 9 is a block diagram depicting an exemplary computer system embodying the computer system for power system scheduling and control (see FIG. 4) according to an embodiment of the present invention. The computer system shown in FIG. 9 includes a processor 901, memory 902, display 903, input device 904 (e.g., keyboard), a network interface (I/F) 905, a media I/F 906, and media 907, such as a signal source, e.g., camera, Hard Drive (HD), external memory device, etc.

In different applications, some of the components shown in FIG. 9 can be omitted. The whole system shown in FIG. 9 is controlled by computer readable instructions, which are generally stored in the media 907. The software can be downloaded from a network (not shown in the figures), stored in the media 907. Alternatively, software downloaded from a network can be loaded into the memory 902 and executed by the processor 901 so as to complete the function determined by the software.

The processor 901 may be configured to perform one or more methodologies described in the present disclosure, illustrative embodiments of which are shown in the above figures and described herein. Embodiments of the present invention can be implemented as a routine that is stored in memory 902 and executed by the processor 901 to process the signal from the media 907. As such, the computer system is a general-purpose computer system that becomes a specific purpose computer system when executing routines of the present disclosure.

Although the computer system described in FIG. 9 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for operating a power generating facility connected to a power distribution grid having an uncertain power generation condition, the method comprising:
predicting a probabilistic power flow forecast in a transmission line of the power distribution grid for a period of time, wherein the transmission line is electrically coupled to the power generating facility;
predicting, using the probabilistic power flow forecast, a probability of congestion over the transmission line of the power distribution grid during the period of time;
generating a mitigation plan, the mitigation plan including a planned load adjustment on the transmission line, using the probability of congestion predicted over the transmission line and a thermal limit constraint of the transmission line, wherein the mitigation plan balances the planned load adjustment and an overlimit line capacity on the transmission line;

controlling the power generating facility, using the mitigation plan, to achieve the load modification and mitigate the probability of congestion predicted in the transmission line; and controlling load shedding within the power distribution grid using the mitigation plan, wherein controlling the load shedding includes adjusting a magnitude of load shedding on the transmission line based at least on the planned load adjustment on the transmission line, the adjusting the magnitude of load shedding being used to reduce the magnitude of load shedding on the transmission line which experienced load shedding at a previous period of time.

2. The method of claim 1, further comprising generating the mitigation plan using a voltage limit constraint of a bus in the power distribution grid, and wherein the mitigation plan balances a voltage violation, together with the planned load adjustment and the overlimit line capacity.

3. The method of claim 1, further comprising controlling a configuration of the power distribution grid using the mitigation plan.

4. The method of claim 3, further comprising releasing an additional transmission line into the power distribution grid to achieve a change in network topology and reduce a load on the transmission line.

5. The method of claim 1, further comprising controlling a demand response unit disposed along an edge of the power distribution grid to reduce a load on the transmission line using the mitigation plan.

6. The method of claim 1, wherein the probabilistic power flow forecast in the transmission line is predicted using a forecast for renewable energy generation in the power distribution grid.

7. The method of claim 1, wherein the probabilistic power flow forecast in the transmission line is predicted using a forecast for energy demand from consumers in the power distribution grid.

8. The method of claim 1, wherein the probabilistic power flow forecast in the transmission line is predicted using a forecast for a state of the power distribution grid using a current condition of the power distribution grid.

9. A method for operating a power generating facility connected to a power distribution grid having an uncertain power generation condition, the method comprising:

predicting a probabilistic power flow forecast in a transmission line of the power distribution grid for a plurality of periods of time in a forecast horizon, wherein the transmission line is electrically coupled to the power generating facility;

predicting, using the probabilistic power flow forecast, a probability of congestion over the transmission line of the power distribution grid during the plurality of periods of time in the forecast horizon;

generating a mitigation plan, the mitigation plan including a planned load adjustment on the transmission line, using the probability of congestion predicted over the transmission line and a thermal limit constraint of the transmission line, wherein the mitigation plan balances the planned load adjustment and an overlimit line capacity on the transmission line, wherein the plurality of periods of time are coupled by a constraint on the planned load adjustment at any period;

controlling the power generating facility, using the mitigation plan, to achieve the load modification and mitigate the probability of congestion predicted in the transmission line;

controlling load shedding within the power distribution grid using the mitigation plan, wherein controlling the load shedding includes adjusting a magnitude of load shedding on the transmission line based at least on the planned load adjustment on the transmission line, the adjusting the magnitude of load shedding being used to reduce the magnitude of load shedding on the transmission line which experienced load shedding at a previous period of time.

10. The method of claim 9, further comprising generating the mitigation plan using a voltage limit constraint of a bus in the power distribution grid, and wherein the mitigation plan balances a voltage violation, together with the planned load adjustment and the overlimit line capacity.

11. The method of claim 9, further comprising controlling a configuration of the power distribution grid using the mitigation plan.

12. The method of claim 11, further comprising releasing an additional transmission line into the power distribution grid to achieve a change in network topology and reduce a load on the transmission line.

13. The method of claim 9, further comprising controlling a demand response unit disposed along an edge of the power distribution grid to reduce a load on the transmission line using the mitigation plan.

14. The method of claim 9, wherein the probabilistic power flow forecast in the transmission line is predicted using a forecast for renewable energy generation in the power distribution grid.

15. The method of claim 9, wherein the probabilistic power flow forecast in the transmission line is predicted using a forecast for energy demand from consumers in the power distribution grid.

16. The method of claim 9, wherein the probabilistic power flow forecast in the transmission line is predicted using a forecast for a state of the power distribution grid using a current condition of the power distribution grid.

* * * * *